United States Patent
Gu et al.

(10) Patent No.: US 10,244,916 B2
(45) Date of Patent: Apr. 2, 2019

(54) CLEANING ROBOT AND METHOD OF CLEANING THEREOF

(71) Applicant: BOE TECHNOLOGY GROUP CO., LTD., Beijing (CN)

(72) Inventors: Yu Gu, Beijing (CN); Kai Zhao, Beijing (CN); Yifei Zhang, Beijing (CN); Hongli Ding, Beijing (CN); Ying Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 156 days.

(21) Appl. No.: 15/527,483

(22) PCT Filed: Nov. 14, 2016

(86) PCT No.: PCT/CN2016/105664
§ 371 (c)(1),
(2) Date: May 17, 2017

(87) PCT Pub. No.: WO2017/177672
PCT Pub. Date: Oct. 19, 2017

(65) Prior Publication Data
US 2018/0192845 A1  Jul. 12, 2018

(30) Foreign Application Priority Data

Apr. 14, 2016  (CN) .......................... 2016 1 0232725

(51) Int. Cl.
*B25J 9/16* (2006.01)
*A47L 11/40* (2006.01)
(Continued)

(52) U.S. Cl.
CPC ........... *A47L 11/4091* (2013.01); *A47L 11/24* (2013.01); *A47L 11/40* (2013.01); *A47L 11/4002* (2013.01);
(Continued)

(58) Field of Classification Search
CPC ........ A47L 11/24; A47L 2201/04; B08B 3/02; B08B 3/04; G05D 1/0274; G05D 1/0297;
(Continued)

(56) References Cited

U.S. PATENT DOCUMENTS

2007/0157420 A1* 7/2007 Lee .......................... A47L 5/225
15/328
2018/0311822 A1* 11/2018 Kaminka ................. B25J 5/005

FOREIGN PATENT DOCUMENTS

CN 104260110 A 1/2015
JP 2003180587 A * 7/2003 ............. A47L 5/225
(Continued)

OTHER PUBLICATIONS

First Office Action in the Chinese Patent Application No. 201610232725.2, dated Jul. 25, 2017; English translation attached.
(Continued)

*Primary Examiner* — Dalena Tran
(74) *Attorney, Agent, or Firm* — Intellectual Valley Law, P.C.

(57) ABSTRACT

The present application discloses a cleaning robot including a primary robot having a first controller configured to control a plurality of first sensors, a first communication module, a first moving apparatus, and a first cleaning assembly; and at least one secondary robot having a second controller configured to control a plurality of second sensors, a second communication module, a second moving apparatus, and a second cleaning assembly.

18 Claims, 10 Drawing Sheets

(51) Int. Cl.
*A47L 11/24* (2006.01)
*B25J 13/08* (2006.01)
*G05D 1/00* (2006.01)
*G05D 1/02* (2006.01)

(52) U.S. Cl.
CPC ....... *A47L 11/4005* (2013.01); *A47L 11/4011* (2013.01); *A47L 11/4061* (2013.01); *B25J 9/1682* (2013.01); *B25J 13/086* (2013.01); *B25J 13/089* (2013.01); *G05D 1/0088* (2013.01); *G05D 1/024* (2013.01); *G05D 1/0227* (2013.01); *G05D 1/0242* (2013.01); *G05D 1/0246* (2013.01); *G05D 1/0255* (2013.01); *G05D 1/0257* (2013.01); *G05D 1/0268* (2013.01); *A47L 2201/022* (2013.01); *A47L 2201/04* (2013.01); *G05D 2201/0203* (2013.01)

(58) Field of Classification Search
CPC ............... G05D 1/0225; G05D 1/0268; G05D 2201/0208; G05D 2201/0215; G05D 2201/0216; Y10S 901/01; B25J 9/1664; B25J 9/0081; B25J 9/1679; B25J 11/0085; B25J 19/0029

USPC .................. 700/248; 414/226.01; 74/490.01; 901/30

See application file for complete search history.

(56) References Cited

FOREIGN PATENT DOCUMENTS

| | | | | |
|---|---|---|---|---|
| JP | 2003180587 | A | 7/2003 | |
| KR | 20060034327 | A | 4/2006 | |
| KR | 20120113188 | A | * 10/2012 | ............. A47L 9/106 |
| KR | 20120113188 | A | 10/2012 | |
| KR | 20140120437 | A | 10/2014 | |

OTHER PUBLICATIONS

Second Office Action in the Chinese Patent Application No. 201610232725.2, dated Sep. 12, 2017; English translation attached.
International Search Report & Written Opinion dated Feb. 4, 2017 regarding PCT/CN2016/105664.

* cited by examiner

CLEANING ROBOT AND METHOD OF CLEANING THEREOF

CROSS-REFERENCE TO RELATED APPLICATION

This application is a national stage application under 35 U.S.C. § 371 of International Application No. PCT/CN2016/105664 filed Nov. 14, 2016, which claims priority to Chinese Patent Application No. 201610232725.2, filed Apr. 14, 2016, the contents of which are incorporated by reference in the entirety.

TECHNICAL FIELD

The present invention relates to a field of robot technology, more particularly, to a cleaning robot and a cleaning method thereof.

BACKGROUND

Modern autonomous robot technology and application are advanced very fast in recent years. Various kinds of cleaning robots, such as sweeping robot, moping robot, and window-cleaning robot, have gradually been used for accomplishing various types of relatively simple cleaning duties in domestic household environment. For large public places with dynamic environment conditions, a large-scale specialized commercial cleaning robot usually is used to do automatic floor cleaning. Most commercial cleaning robots are differentiated from the household cleaning robot in terms of greater autonomy function, much longer battery endurance time, larger volume and capacity, and more demands on performances of various kinds of environmental sensor devices. Because of its characteristics for holding large quantity of trashes and demanding longer operation endurance, it generally results in a larger body size and volume. This limits its ranges of motion and locations of application. For example, for the floor areas under tables or in narrow aisles that cannot be reached by the large commercial cleaning robot, manpower is still needed for cleaning.

SUMMARY

In one aspect, the present invention provides a cleaning robot comprising a primary robot comprising a first controller configured to control a plurality of first sensors, a first communication module, a first moving apparatus, and a first cleaning assembly; and at least one secondary robot comprising a second controller configured to control a plurality of second sensors, a second communication module, a second moving apparatus, and a second cleaning assembly; wherein the plurality of first sensors are configured to collect a plurality of environmental parameters associated with a target zone inaccessible to the primary robot; the first controller is configured to drive the first moving apparatus and the first cleaning assembly to perform a first cleaning task outside the target zone, to generate a first command signal based on the plurality of environmental parameters, and to control the first communication module to transmit the first command signal to the second communication module; and the second controller is configured to drive the second moving apparatus to have a secondary robot moving into the target zone and operate the second cleaning assembly of the secondary robot to perform a second cleaning task inside the target zone, upon receiving the first command signal from the second communication module.

Optionally, the plurality of first sensors comprises one or more of an infrared sensor, a visual sensor, an ultra-sound sensor, a laser radar sensor, a cliff sensor, a bumper sensor, a gyro sensor, and any combination thereof.

Optionally, the plurality of environment parameters associated with the target zone comprises one or more of height, width, shape, humidity, particle densities of the target zone and any objects therein.

Optionally, the primary robot further comprises a chamber configured for holding the at least one secondary robot; the second controller is configured to drive the second moving apparatus to have a secondary robot released from the chamber into the target zone; the chamber comprises a door panel having a first end coupled to a shaft and configured to rotate around the shaft and a second end; the first controller is configured to open the door panel of the chamber such that the door panel rotates relative to a shaft till the second end touching a floor surface at a first location while controlling the first communication module to transmit the first command signal to the second communication module, and configured to record a location information of the first location; and the second controller is configured to drive the second moving apparatus to have the secondary robot released from a docking position in the chamber via the door panel onto the floor surface at the first location upon receiving the first command signal, and configured to record the location information of the first location before further driving the second moving apparatus to move the secondary robot to any second location in the target zone.

Optionally, the cleaning robot further comprises a first power supply having a first charge capacity in the primary robot and a second power supply having a second charge capacity in the secondary robot, the first charge capacity being substantially larger than the second charge capacity; wherein the second controller is configured to generate a second command signal based on readout of a current power capacity of the second power supply below a first threshold value and to control the second communication module to transmit the second command signal to the first communication module.

Optionally, upon receiving the second command signal at the first communication module, the first controller is configured to maintain the secondary robot at the docking position in the chamber and control the first power supply to charge the second power supply until the readout of the current power capacity of the second power supply is above a second value, the second value being greater than the first threshold value.

Optionally, the second controller is configured to generate a third command signal based on readout of the current power capacity of the second power supply below a third value, the third value being less than the first threshold value; or based on a sensed value indicating that the second cleaning task is finished and to control the second communication module to transmit the third command signal to the first communication module.

Optionally, upon receiving the third command signal at the first communication module, the first controller is configured to drive the first moving apparatus to move the primary robot back to the first location based on the recorded location information in the first controller and open the door panel of the chamber so that the dour panel rotates relative to the shaft to have one end touching the floor surface at the first location; and the second controller is configured to drive the second moving apparatus to move the secondary robot from any second location to the first location based on the recorded location information in the second controller.

Optionally, the first controller is further configured to control the plurality of first sensors to collect a plurality of environment parameters associated with the secondary robot moving from the floor surface at the first location onto the door panel, and to control the door panel gradually rotating towards the chamber based on the plurality of environment parameters indicating the secondary robot at a predetermined position of the door panel while moving towards the docking position in the chamber.

Optionally, the second controller is further configured to control the plurality of second sensors to collect a plurality of environment parameters associated with a relative orientation of the primary robot and the secondary robot, to calculate an offset for a current moving path of the secondary robot, and to adjust moving direction of the secondary robot based on the offset.

Optionally, the at least one secondary robot includes multiple secondary robots, each of the multiple secondary robots is characterized by a series of character parameters comprising a shape, a size, and a code representing one or more cleaning functions; and the first controller is configured to calculate a matching degree parameter based on a comparison between the plurality of environmental parameters associated with the target zone and the series of character parameters of each of the multiple secondary robots, and to control the first communication module to transmit the first command signal to a second communication module of a corresponding one of the multiple secondary robots having the highest matching degree parameter indicating a closest matching between the plurality of environmental parameters associated with the target zone and the series of character parameters.

Optionally, the plurality of second sensors comprise a first sensor to detect trash amount collected by the second cleaning assembly and a second sensor to detect cleaning agent amount stored in the second cleaning assembly; and the second controller is configured to determine that the second cleaning task is finished when the first sensor detects no change in the trash amount over a certain period of time or the second sensor detects the cleaning agent amount to be substantially below a threshold value.

Optionally, the first communication module and the second communication module are configured to communicate via one or more of Radio, Wireless, and GPS technologies selected from one of a group of Bluetooth™, Infrared, Zigbee™, GRPS, and WI-FI™ or a combination thereof.

Optionally, a surface of the second end distal to the floor surface is a curve surface.

Optionally, an angle between the surface of the door panel distal to the floor surface and the floor surface is substantially equal to or less than 14 degrees.

In another aspect, the present invention provides a method of operating the cleaning robot comprising sensing a target zone via the plurality of first sensors to collect a plurality of environment parameters; determining that the primary robot is larger than the target zone, and transmitting a first command signal to the secondary robot; receiving the first command signal by the secondary robot; releasing the secondary robot from a docking position in the primary robot upon receiving the first command signal by the secondary robot; and performing a second cleaning task by the secondary robot in the target zone.

Optionally, the method further comprises upon receiving the first command signal by the secondary robot, determining whether a power capacity available to the secondary robot is larger than a first threshold capacity to operate the secondary robot to perform the second cleaning task in the target zone; if the power capacity available to the secondary robot is smaller than or equal to the first threshold capacity; sending a second command signal to the primary robot; charging the secondary robot retained in the chamber of the primary robot; and performing a first cleaning task by the primary robot outside the target zone.

Optionally, the method further comprises recording location information in the secondary robot, the location information including a first location of releasing the secondary robot from the primary robot; determining whether the power capacity available to the secondary robot is smaller than or equal to a second threshold capacity; if the second threshold capacity is smaller than the first threshold capacity; sending a third command signal to the primary robot; and moving the secondary robot from any location in the target zone back to the first location after sending the third command signal.

Optionally, the method further comprises recording the location information in the primary robot, the location information including the first location of releasing the secondary robot from the primary robot; receiving the third command signal by the primary robot; and moving the primary robot back to the first location upon receiving the third command signal by the primary robot.

Optionally, the primary robot comprises a chamber, the method further comprises sensing by the secondary robot that the primary robot returns to the first location while the secondary robot is moving back to the first location; and moving the secondary robot back into the chamber if the primary robot is at the first location.

Optionally, the primary robot comprises a door having a shaft located at a bottom of the door, a door panel having a first end connected to the shaft, the method comprises controlling the door panel to rotate away from the door until a second end of the door panel reaches a floor surface before the secondary robot back to the first location; moving the secondary robot along the door panel from the second end towards the door for entering the chamber; sensing by the primary robot that the secondary robot moves to a predetermined position on the door panel; and controlling the door panel to rotate towards the door while the secondary robot is moving back to the docking position of the chamber.

Optionally, the method further comprises sensing by the secondary robot a spatial relation between the secondary robot and the door; calculating an offset for a current direction of the secondary robot; and adjusting the moving direction based on the offset.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now describe more specifically with reference to the following embodiments. It is to be noted that the following descriptions of some embodiments are presented herein for purpose of illustration and description only. It is not intended to be exhaustive or to be limited to the precise form disclosed.

Figure 1:
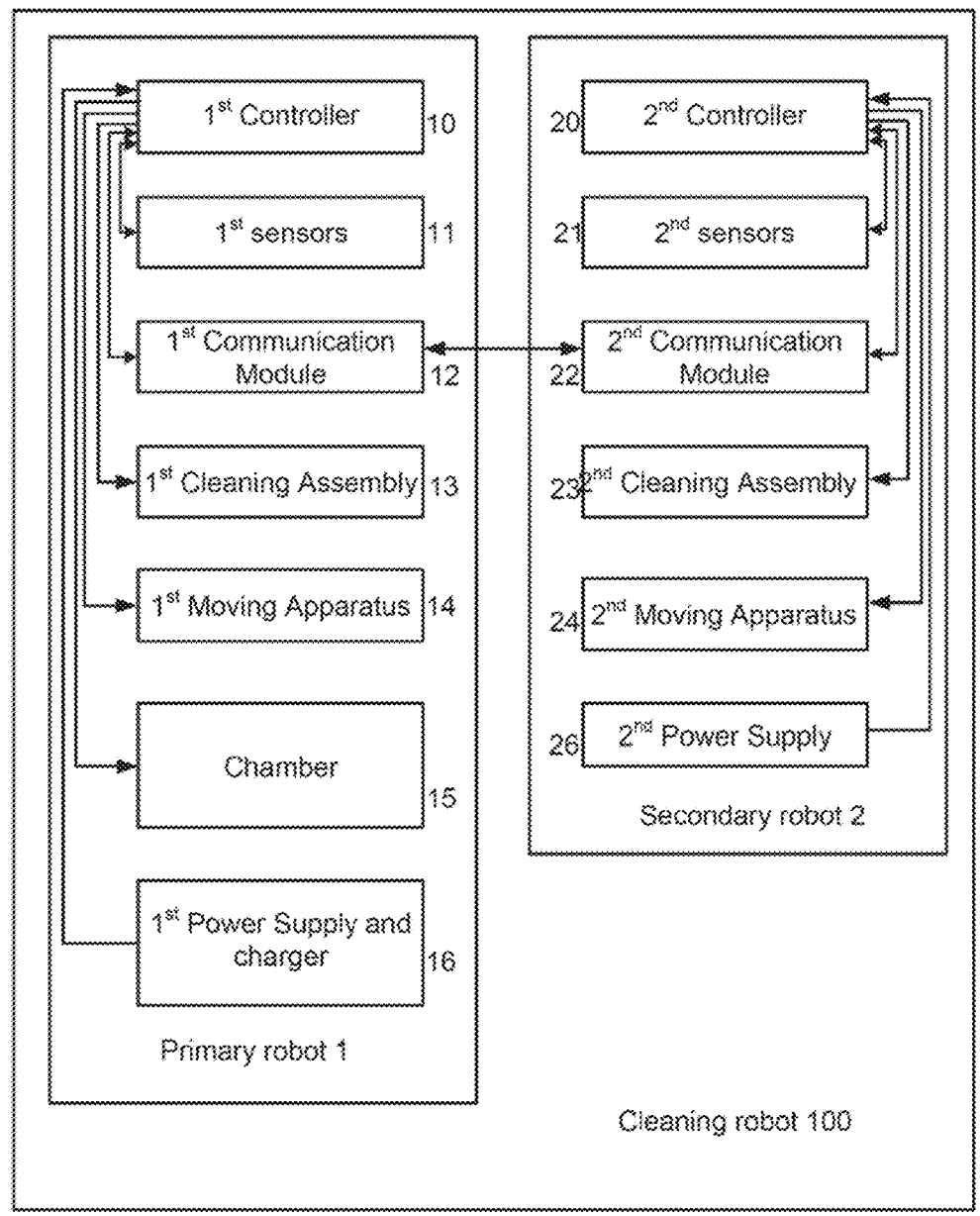
FIG. 1 is a simplified block diagram of a cleaning robot comprising a primary robot and a secondary robot in some embodiments.

FIG. 1 is a simplified block diagram of a cleaning robot in some embodiments. Referring to FIG. 1, the cleaning robot 100 includes a primary robot 1 and a secondary robot 2. The primary robot 1 holds a substantially entire body volume of the cleaning robot 1 and is configured to do autonomous cleaning work and include a chamber 15 for holding at least one secondary robot 2 which has a smaller body volume than the primary robot 1 and can be released from the primary robot 1 to perform another autonomous cleaning task assigned by the primary robot 1. The primary robot 1 includes a first controller 10 powered by a first power supply 16 and configured to control a plurality of first sensors 11, a first communication module 12, a first moving apparatus 13, a first cleaning assembly 14, and the chamber 15. The secondary robot 2 includes a second controller 20 powered by a second power supply 26 and configured to control a plurality of second sensors 21, a second communication module 22, a second moving apparatus 23, and a second cleaning assembly 24.

The secondary robot 2 may be detachable attached to the primary robot 1 by various appropriate methods. Optionally, the secondary robot 2 is releasably hung on the primary robot 1. Optionally, the secondary robot 2 is releasably tied onto the primary robot 1. Optionally, the secondary robot 2 is magnetically coupled to the primary robot 1, and can be released from the primary robot 1.

The plurality of first sensors includes one or more infrared sensors, one or more optical visual sensors, one or more ultra-sound sensors, one or more laser radar sensors, one or more cliff sensors, one or more bumper sensors, and one or more self-driving gyro sensors. In some embodiments, the plurality of first sensors 11 is used to collect a plurality of environment parameters including heights, widths, shapes, humidity, particle densities associated with areas around the primary robot. Some of the first sensors are used to visually inspect nearby environment around the primary robot including regions that need the primary robot to do cleaning work and other regions or obstacles that need to be avoided. Some of the first sensors are used to identify a target zone that the primary robot may not be able to enter by measuring its dimension (height, length, width, or depth) in comparison with those parameters of the primary robot so that a smaller-size secondary robot may be assigned. Some first sensors are used to detect nearby objects particularly those inside the target zone by measuring their sizes, shapes, estimated qualities, and relative locations. Some first sensors are used to guide a motion of the primary robot and avoid falling off using cliff sensing function. Some first sensors are used to guide cleaning process and monitor trash amounts collected and cleaning agent amount used. Some first sensors are used to determine current location of the primary robot 1 and also used to determine current location of the secondary robot 2 to monitor the release or return of the secondary robot 2.

In some embodiments, the first controller 10 is configured to receive the plurality of environment parameters associated with the target zone collected by the plurality of first sensors 11. These environment parameters usually are represented by analog signals. In some embodiments, the first controller 10 includes analog-to-digital converters to convert the analog signals to corresponding digital signals and to process these digital signals with various calculations and comparison analysis with pre-stored data associated with the primary robot 1.

In some embodiments, the first controller 10, based on results of processing the digital signals, determines that the primary robot 1 cannot enter the target zone. The target zone may be just part of existing floor surface where the primary robot 1 is moving on and is performing its cleaning task via the first cleaning assembly 14. For example, the environment parameters associated with the target zone indicate that the primary robot is too large in size (height or width) to enter the target zone. At the same time, the environment parameters may indicate that the floor area or side wall area may need cleaning. Thus after processing the environment parameters by the first controller 10, it generates a first command in terms of a signal and sends to the first communication module 12. Under the control of the first controller 10, the first communication module 12 transmits the digital signal to the second communication module 22 of a secondary robot 2 which is currently held inside the chamber 15 of the primary robot 1. Once the digital signal representing the first command is received by the second communication module 22, it is passed to the second controller 20. The second controller 20 can initiate a drive signal to activate the second moving apparatus 23 to drive a motion of the secondary robot 2. In particular, the secondary robot 2, driven by the second moving apparatus 23, can be released from the chamber 15 of the primary robot 1 to the floor surface and continue to move into the target zone. The second controller 20 further is configured to activate the second cleaning assembly 24 to perform an autonomous cleaning task inside the target zone.

In some embodiments, the cleaning robot 100 is configured to utilize the primary robot and the secondary robot with different volumes for performing cleaning tasks at different working zones. The primary robot 1 has a much larger volume, a larger trash-holding capacity, a larger power capacity and moving ability than the secondary robot 2, so that the primary robot 1 is often used to drive the first cleaning assembly 12 to perform a first cleaning task in most working zones with open floors. But for some unusual target zones (with relative low in height, narrow in width, or with special shapes) where the primary robot is unable to enter to perform the first cleaning task, the smaller secondary robot 2 can be used to perform a second cleaning task inside each of those unusual target zones.

In some embodiments, the signal representing the first command is transmitted from the first communication module 12 to the second communication module 22 using one of several Radio, wireless, or GPS communication technologies selected from Bluetooth™ technology, Infrared technology, Zigbee™ technology, GRPS technology, and WI-FI™ technology. Since the secondary robot 2 most likely only enters a target zone that is less than several 10s meters away from the primary robot, most wireless communication technologies for short-range applications should be applicable to both the first communication module 12 and the second communication module 22. The second communication module 22 is also able to transmit a wireless signal to the first communication module 12 using a same one of above technologies mentioned above.

In some embodiments, after the second communication module 22 receives the signal representing the first command, it transfers the signal via a serial communication channel to the second controller 20. The serial communication channel can be a wired communication line or a wireless channel. By processing the signal passed from the second communication module 22, the second controller 20 is able to perform a power check operation to read a current power capacity available in the second power supply 26 and determine if the current power capacity is smaller than or equal to a first power value. This first power value is to be a pre-calculated minimum power amount required to drive the secondary robot 2 to leave the chamber 16, reach the target zone, complete minimum cleaning task there, and return to the chamber 16, based on the property and status of the second power supply 26. The power readout can be done via one of the plurality of second sensors 21 connected to the second power supply 26. Once the second controller 20 determines that the current power capacity is smaller than the first power value, it will generate a second command. Correspondingly, a signal representing the second command will be sent to the second communication module 22 via the local bus associated with the second controller 20. The second communication module 22 then transmits the signal back to the first communication module 12 wirelessly. Further the signal is sent to the first controller 10 via the serial communication channel thereof.

The power readout operation can be performed even before the second moving apparatus 23 is activated to initiate the release of the secondary robot 2 from the chamber 15 of the primary robot 1. If the power readout operation results indicate that the current power capacity is smaller than or equal to a first power value, the activation of the second moving apparatus 23 will be suspended so that secondary robot 2 will be kept at its position in the chamber 15, which is also configured to be a docking position of a charger connected to the first power supply 16. The first controller 10, after receiving and processing the signal representing the second command, it will activate the charger to charge the second power supply 26 of the secondary robot 2. The first power supply 16, for example, is a battery having a first charge capacity substantially larger than the second charge capacity of a battery of the second power supply 26. During the charging time, the primary robot 1 can drive its first cleaning assembly 14 to perform a first cleaning task outside the target zone, or can be put into a stand-by status if cleaning thereof is unnecessary. The charging of the secondary robot 2 can be stopped once the readout of the current power capacity available in the second power supply 26 is greater than or equal to a second power value (which is set to be larger than the first power value). Of course, the charging can be performed even before the first command is generated to release the secondary robot 2 so that the secondary robot 2 can be ready to go by then.

After the charging, the first controller 10 can send a control signal to halt any motion driven by the first moving apparatus 13 to keep the primary robot 1 at a static status and the second controller 20 may send a request command via the second communication module 22 and the first communication module 12 to the first controller to initiate the release of the secondary robot 2. The first controller 10 may send a control signal to the chamber 16 to facilitate the release, for example, to open a door of the chamber 16 or set a moving path for the secondary robot 2. The second controller 20 reactivates the second moving apparatus 23 to drive the secondary robot 2 to leave the door of the chamber 16 along the set moving path and enter the target zone. The second controller 20 further sends a control signal via the serial communication channel to drive the second cleaning assembly 24 to perform a second cleaning task by itself in the target zone. In some embodiments, each of the first cleaning assembly 14 and the second cleaning assembly 24 is configured to be a vacuum cleaner (with sweeping brushes) connected to a trash holder, or a washing cleaner having a cleaning agent such as detergent (for sprayer) or water (for generating steams), or a combination of those different types of cleaners.

After the secondary robot 2 enters the target zone to perform the second cleaning task, the second controller 20 can perform the power check operation once or many times to determine if the current power capacity available is still greater than a third power value. The third power value is a pre-calculated power capacity that is sufficient to allow the secondary robot 2 to return from the target zone to the chamber 16 of the primary robot 1. The third power value is set to be smaller than the first power value. Once the second controller 20 determines that the current power capacity is smaller than or equal to the third power value, it will generate a signal representing a third command and transmit the signal wirelessly via the second communication module 22 to the first communication module 12 and to the first controller 10. The third command requests to move the secondary robot 2 back to the chamber of the primary robot 1.

Alternatively during performing the second cleaning task, the second controller 20 is configured to perform a cleaning-status check operation to use one or more second sensors 21 in the secondary robot 2 to detect accumunated quantity of trashes in a trash container of the second cleaning assembly 24 or to use one or more second sensors 21 to detect available amount of cleaning agent in the second cleaning assembly 24. If the accumunated quantity of trashes in a trash holder of the second cleaning assembly 24 is substantially no change over a certain time or the available amount of cleaning agent in the second cleaning assembly 24 becomes substantially zero, the second cleaning task is considered to be at least partially finished and the second controller 20 will also generate a signal representing the third command and transmit the signal wirelessly via the second communication module 22 to the first communication module 12 and to the first controller 10. The third command requests to move the secondary robot 2 back to the chamber of the primary robot 1.

In some embodiments, each of the first controller 10 and the second controller 20 includes a memory device. Once the first command drives the secondary robot 2 to be released from the primary robot 1, from the chamber 16 to a first location on the floor surface near the target zone, one of the first sensors can be used to collect information in terms of relevant environment parameters for identifying the first location where the primary robot 1 is preferred to be at a static status at least before the secondary robot 2 is fully released onto the floor surface. The information about the first location can be stored in the corresponding memory device associated with the first controller 10. Similarly, the memory device associated with the second controller 20 also stores the information about the first location associated with the release of the secondary robot 2 from the primary robot 1. Of course, the information about the first location can also be shared or synchronized between the first controller 10 and the second controller 20 via the first communication module 12 and the second communication module 22.

In some embodiments, after sending out the signal representing the third command, the second controller 20 will drive the second moving apparatus 23 to move the secondary robot 2 back to the first location where the secondary robot 2 is originally released based on the information stored in the memory device associated with the second controller 20. At the same time, as the first controller 10 receives the signal representing the third command, it will also send a control signal to drive the first moving apparatus 13 to make the primary robot 1 returning to the first location based on the location information stored in the memory device associated with the first controller 10, unless the primary robot 1 stays at the first location without any move after sending out the first command for releasing the secondary robot 2.

In some embodiments, the third command is sent by the secondary robot 2 during the performing of the second cleaning task in the target zone as it may experience certain accidental events to cause excessive power consumption that drains the power capacity fast to a level to the third power value or lower before finishing the cleaning task. Alternatively, the third command may be sent due to excessive trash amount in the target zone and the trash holder is full before finishing the cleaning task. The third command may be sent due to running out of cleaning agent demanded for certain special cleaning tasks before it is finished. The secondary robot 2 then can be recalled back to the primary robot 1 to recharge, or dump trash to clear its trash holder, or re-fill cleaning agent before being released from the primary robot 1 again to continue its un-finished cleaning task in the target zone.

Figure 2:
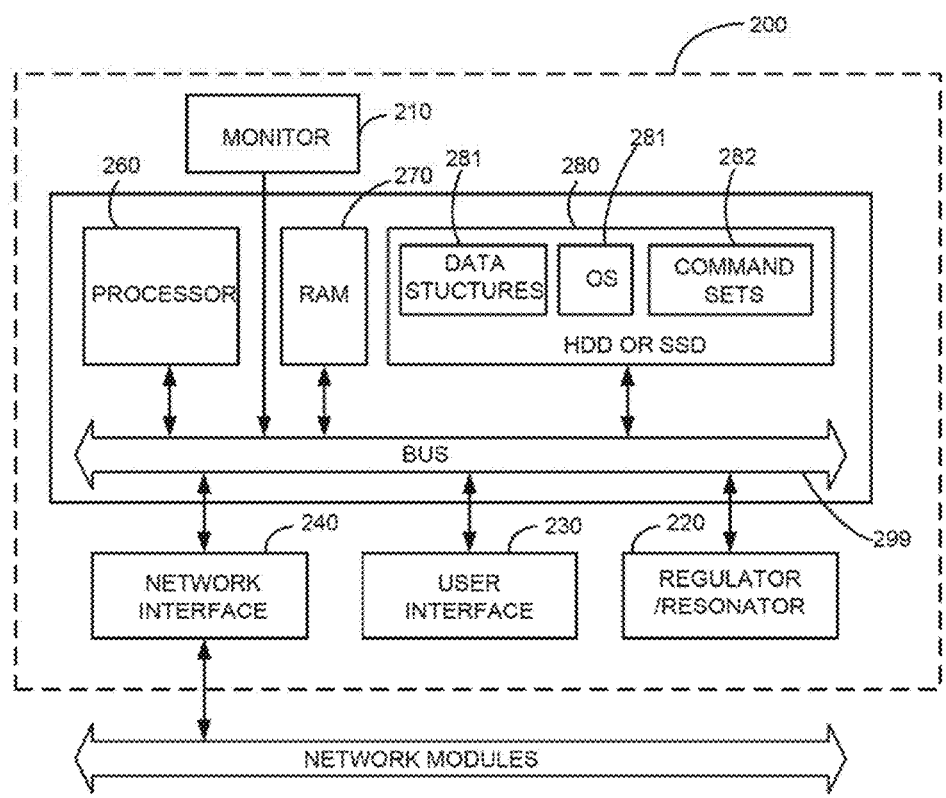
FIG. 2 is a system diagram illustrating a controller disposed in the primary robot or the secondary robot of FIG. 1 in some embodiments.

FIG. 2 is a system diagram illustrating a controller for the cleaning robot in some embodiments. Referring to FIG. 2, the controller 200 includes at least a processor 260, a random access memory (RAM) 270, an embedded data structure 281 or command sets 283, a communication bus 299 to connect each component above and a network interface 240, a user interface 230, and one or more power regulators/clock resonator 220. In some embodiments, for example, for larger primary robot 1, the first controller 10 may adopt the controller 200 shown in FIG. 2, additionally includes a monitor 210, a fixed disk drive (hard disk drive or solid-state drive) 280 with an operation system 282, and full spectrum of digital/analog I1O schemes. The processor 260 is capable of performing the necessary computations and logic to carry out the procedures and operations of network modules based on preset programs. The network modules controlled by the first controller 10 via the network interface 240 includes at least the first communication module 12, the first moving apparatus 13, the first cleaning assembly 14, and the chamber 15 holding the secondary robot 2. In addition, the chamber 15 includes a door 17 having a door panel 18 coupled to a shaft at lower end of the door 17. In some embodiments, the first controller 10 is able to control opening of the door panel 18 when the secondary robot 2 is released. The door panel 18 is used as a moving path to allow the secondary robot 2 moving out or in the chamber 16.

RAM 270 and fixed disk drive 280 are mere examples of tangible media for storage of computing programs, digital data, instruction sets and code implementing embodiments. Other types of tangible media include SRAM, optical storage media such as CD-ROMs and bar codes, semiconductor memories such as flash memories, stick memories, read-only-memories (ROMs), ASICs, battery-backed volatile memories, and the like.

The network interface includes a local bus and a remote bus. The local bus can be wired interface or wireless interface, allowing substantially all local modules or operation apparatuses including the secondary robot 2 (via the first communication module 12) to be driven or controlled by the first controller 10. The local bus also includes multiple analog signal and digital data I/O ports plus user LEDs to receive various input signals (for example sensor signals collected by the plurality of first sensors 11, signals generated from the one or more regulators 220) or output signals such as motor drive signals for controlling the moving apparatus, cleaning assembly or chamber door panel. The user interface 230 optionally includes a mouse, a trackball, a keyboard, a keypad, a joystick, a digitizing tablet, a wireless controller, a microphone, user Universal Asynchronous Receiver/Transmitter (UART) or other input devices, allowing user to directly control, interfere or change the operation of the primary robot 1. The wireless controller may be coupled with the first/second communication module 12/22, for example, using a wireless interface such as IEEE 802.11, IEEE 810.15.4, or others, to indirectly control the operation of the secondary robot 2. The remote bus can be implemented via Ethernet, cellular network, telephone network, or even satellite network if necessary.

In some embodiments, the controller may take the form of a computer system, dedicated microcontroller, or other devices capable of achieving this or similar functionality. For smaller secondary robot 2, the second controller 20 may adopt a simplified version of the controller 200. For example, it only needs a microprocessor with pre-loaded programs for control command sets and data signal structures for processing sensor signals and driving the second moving apparatus 23 and the second cleaning assembly 24, a flash memory device to store temporary information associated with its operation, a network interface for connecting at least the second communication module 22 for communicating with the primary robot 1, and a simple user interface with a few push buttons, user LED display or indicators.

In some embodiments, the plurality of second sensors 21 in the secondary robot 2 is configured to sense and detect the motion and position of the primary robot 1, especially when the secondary robot 2 is moving towards the first location corresponding to the release of the secondary robot 2. Like the plurality of first sensors 11, the second sensors include obstacle avoidance sensors (such as infrared sensor, optical vision sensor, Ultra-sound sensor, and laser radar sensor), falling-prevention based on the cliff sensor, physical bumper sensor, and self-driving gyro sensor, and the likes. By collecting these sensor signals from the second sensors 21 and processing these sensor signals through the second controller 20, the secondary robot 2 can determine if the primary robot 1 has returned to the first location while being driven via the second to return the first location.

Figure 3:
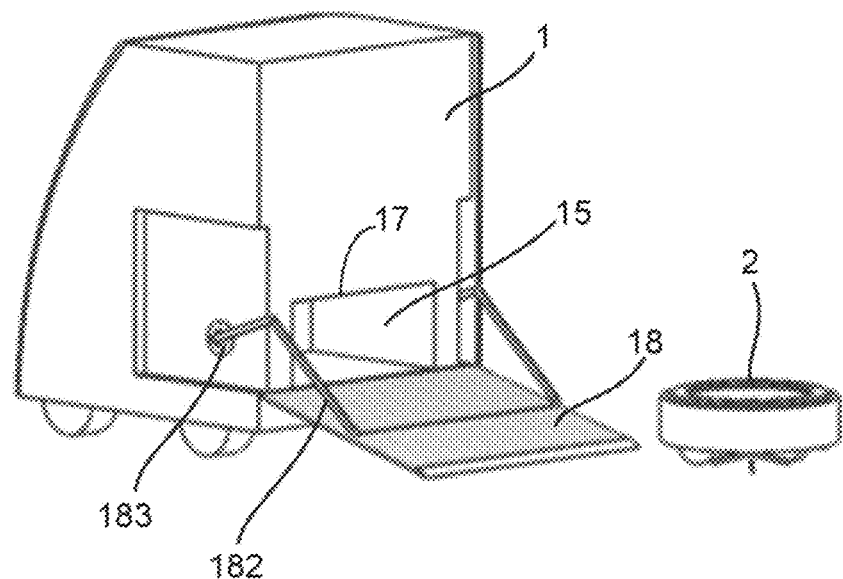
FIG. 3 is a simplified diagram illustrating a cleaning robot having a secondary robot being released from a chamber of a primary robot via a door structure in some embodiments.

FIG. 3 is a simplified diagram illustrating a cleaning robot having a secondary robot being released from a chamber of a primary robot via a door structure in some embodiments. Referring to FIG. 3, on two side wall positions of the primary robot 1, a motor 183 can be disposed to connect the door panel 18 through two connection rods 182 mounted to two positions near middle region of the door panel 18. The door panel 18 has a first end coupled to a shaft (not explicitly shown in FIG. 3) disposed near lower side of the door 17. In some embodiments, the first controller 10 in the primary robot 1 is configured to drive the motor 183 to cause the door panel 18 to rotate away from the door 17 against the shaft from a close position to an open position until a second end of the door panel 18 reaches the floor surface. The top surface of the door panel 18, after the second end touches the floor surface, may form a slightly sloped angle relative to the floor surface. The sloped angle is set to be greater than 0° but smaller than or equal to 14° which is relatively small to allow the secondary robot 2 with enough gradeability to move upward and return to the chamber 15 of the primary robot 1.

Figure 4:
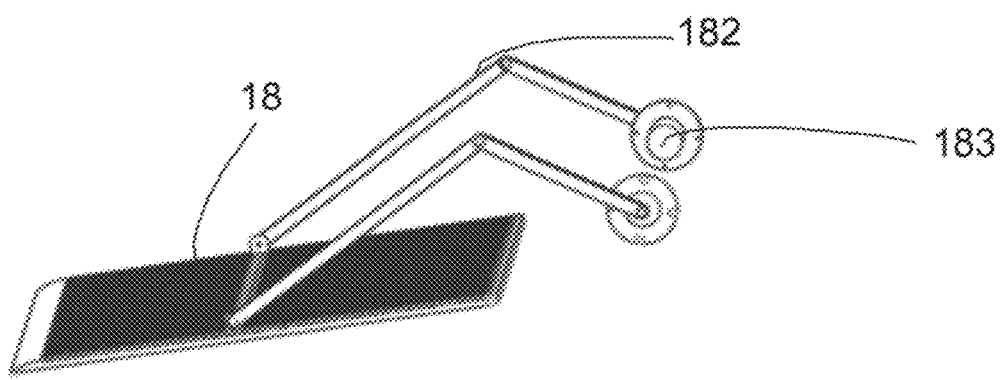
FIG. 4 is a simplified diagram of the door panel of the door structure of FIG. 3 in some embodiments.

FIG. 4 is a simplified diagram of the door panel of the door structure of FIG. 3 in some embodiments. Referring to FIG. 4, once the door panel 18 is in the open position, an inner side of the door panel 18 becomes a top side, which serves as a moving path for the secondary robot 2 to be released out of the chamber 15 or returned back into the chamber 15.

Figure 5:
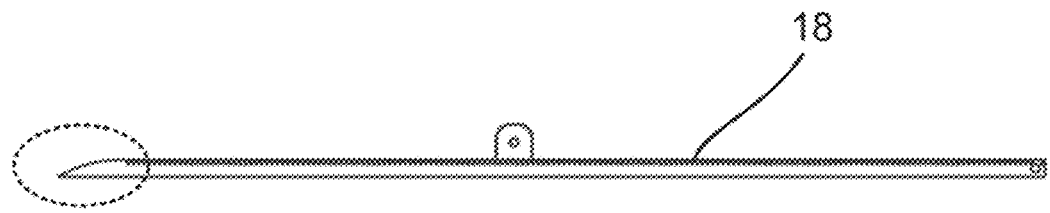
FIG. 5 is a side view of the door panel of FIG. 4 in some embodiments.

FIG. 5 is a side view of the door panel of FIG. 4 in some embodiments. Referring to FIG. 5, the second end (to the left of the door panel 18) is touching the floor surface when the door panel 18 is in full open position. The second end has its top side being configured to a curved surface for facilitating in and out of the secondary robot 2 during its return or release crossing the second end of the door panel from or to the floor surface with reduced resistance. In some embodiments, the top surface of the door panel 18 is made a roughened surface to enhance friction so that the secondary robot 2 is able to move upward or downward without slipping on the top surface of the door panel 18. For example, the roughed surface can be created by spraying certain sized particles.

Figure 6:
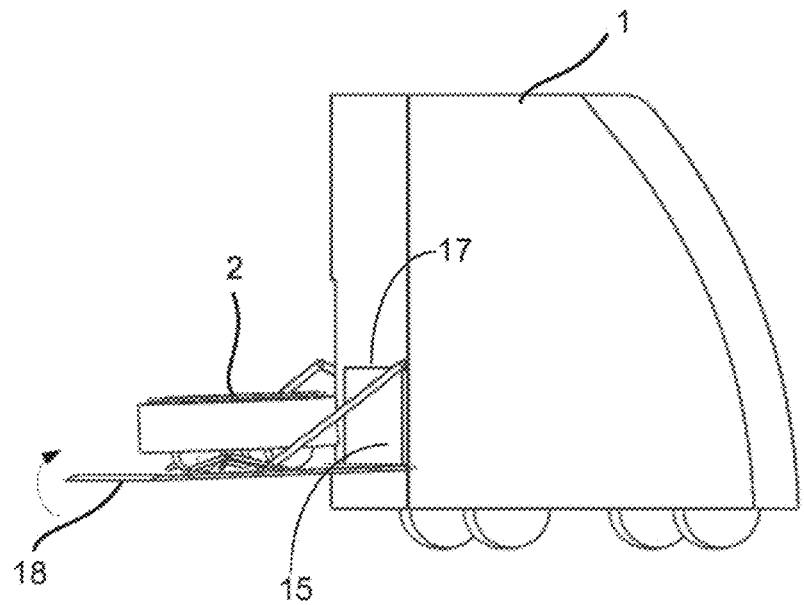
FIG. 6 is a simplified diagram illustrating a primary robot to control a door panel for recovering a secondary robot in some embodiments.

FIG. 6 is a simplified diagram illustrating a primary robot to control a door panel for recovering a secondary robot in some embodiments. Referring to FIG. 6, the first sensors 11 in the primary robot 1 are configured to sense the location of the secondary robot 2. In particular, the first sensors 11 are able to send a sensor signal to the first controller 10 once it detects that the secondary robot 2 reaches to a predetermined position on the top surface of the door panel 18. The first controller 10 processes the sensor signal and generate a control signal to drive the motor 183 to start rotate the door panel 18 towards the door 17 so that the motion of the door panel 18 helps the secondary robot 2 to return smoothly back to the chamber 15. Optionally, the predetermined position can be set based on a relative distance of the secondary robot 2 from the door 17 of the chamber 15. For example, the relative distance may be set to 10 cm. Optionally, the predetermined position can be set based on a position of the secondary robot 2 on the door panel 18, for example, having a first distance from the second end touching the floor surface to be equal to a second distance away from the door 17.

Of course, using the door structure as described above in this disclosure is merely one scheme of releasing or recovering the secondary robot from or to the primary robot. Other schemes are possible, for example, an elevator may be used for lifting or lowering the position of the secondary robot from the floor surface to a docking position in the chamber of the primary robot or vise versa.

In some embodiments, the plurality of second sensors 21 is configured to determine a relative spatial relationship between the secondary robot 2 returned to the first location on the floor surface before moving onto the door panel 18 and the door 17 of the chamber 15 of the primary robot 1 returned to the first location. Some sensor signals can be collected to define the relative spatial relationship. For example, a first distance and a second distance of a sensor position on the secondary robot 2 can be measured away from a first side and a second side of the door 17, respectively. In another example, a first incidence angle and a second incidence angle of the sensor position relative to the first side and the second side of the door 17 can be measured and used to define the spatial relationship between the secondary robot 2 and the door 17.

Figure 7A:
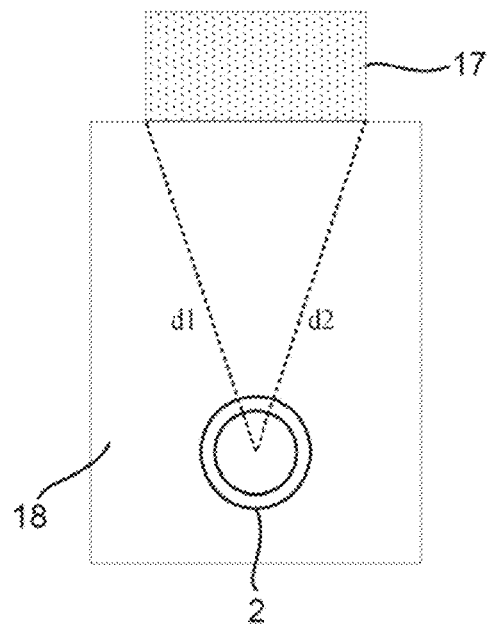
FIGS. 7A and 7B are simplified diagrams illustrating a correction scheme of adjusting the secondary robot position and moving direction to return to the primary robot in some embodiments.
Figure 7B:
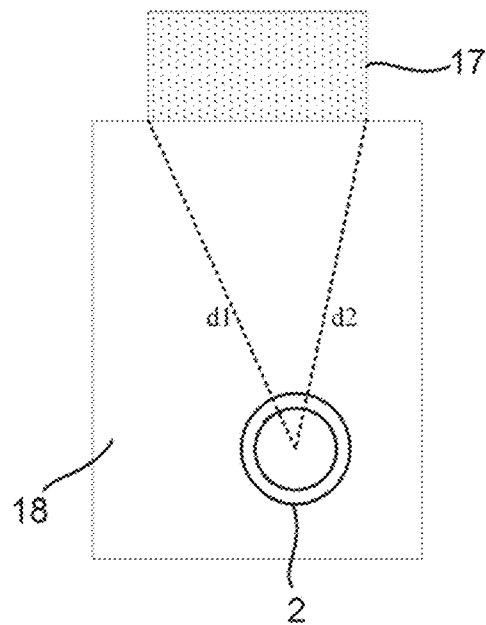

FIGS. 7A and 7B are simplified diagrams illustrating a correction scheme of adjusting the secondary robot position and moving direction to return to the primary robot in some embodiments. As shown, a second sensor senses its distance away from left side of the door 17 is d1 and its distance away from right side of the door 17 is d2. After the second controller 20 processed the sensor signals associated with d1 and d2, the second controller 20 can determine that the current moving path of the secondary robot 2 to return to the chamber 15 is substantially matched with the predetermined pathway on the door panel 18 if d1 is substantially equal to d2 (see FIG. 7A). Alternatively, if the distance d1 is found larger than the distance d2 (see FIG. 7B), the second controller 20 determines that the position of the secondary robot 2 is off towards right. The second controller 20 sends a control signal to drive the second moving apparatus 23 to shift the secondary robot 2 position slightly to the left.

Figure 8A:
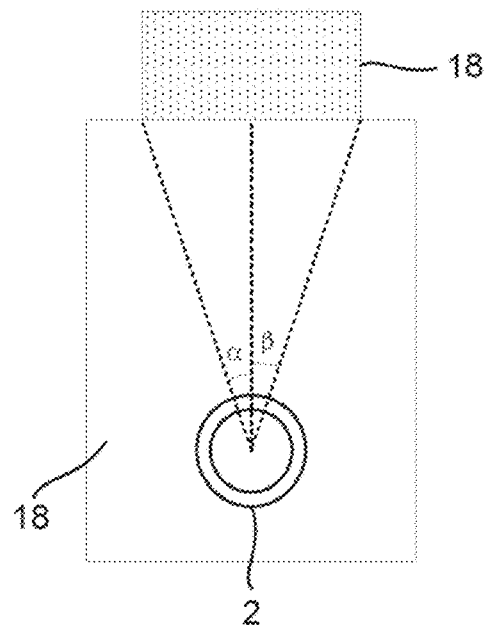
FIGS. 8A and 8B are simplified diagrams illustrating another correction scheme of adjusting the secondary robot position and moving direction to return to the primary robot in some embodiments.
Figure 8B:
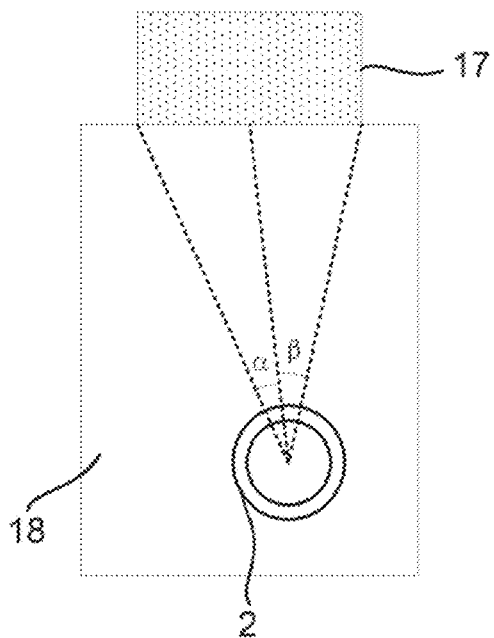

FIGS. 8A and 8B are simplified diagrams illustrating another correction scheme of adjusting the secondary robot position and moving direction to return to the primary robot in some embodiments. As shown, a second sensor senses its incidence angle relative to the left side of the door 17 is α and its incidence angle relative to the right side of the door 17 is β. After the second controller 20 processed the sensor signals associated with a spatial relationship between the secondary robot 2 and the chamber door 15 in terms of angles α and β, the second controller 20 can determine that the current moving path of the secondary robot 2 to return to the chamber 15 is substantially matched with the predetermined pathway on the door panel 18 if α is substantially equal to β (see FIG. 8A). Alternatively, if the angle α is found larger than the angle β (see FIG. 8B), the second controller 20 determines that the moving direction of the secondary robot 2 is off towards right. The second controller 20 thus sends a control signal to drive second moving apparatus 23 to adjust its moving direction slightly to the left. In general, the sensor signal about the spatial relationship will be used as a feedback signal in a correction scheme of dynamically adjusting position and moving direction of the secondary robot 2 during its journey of return from the first location at the floor surface through the door panel 18 to the docking position inside the chamber 15 of the primary robot 1.

Although both the primary robot 1 and the secondary robot 2 are instructed by the third command to move back to the first location based on respectively stored location information, environmental and internal noises may cause errors to both robots. Assuming that the primary robot returns to the first location to set the door structure. A second location that the secondary robot 2 reaches may still be slightly off from the first location as it moves from a random location in the target zone. Thus, once the secondary robot 2 returns to the second position on the floor surface, the second controller 20 receives the sensor signals regarding the relative spatial relationship between the secondary robot 2 at the second location and the door 17 of the chamber 15. The second controller 20 further calculates an offset between the second location and the first location associated with the predetermined pathway on the door panel 18. The offset is used as an input signal for driving the second moving apparatus 23 to correct the position and moving direction of the secondary robot 2. This correction scheme is to ensure that the secondary robot 2 can return smoothly back to its docking position inside the chamber 15 and at least will not fall off when it moves along the door panel 18.

In some embodiments, the primary robot 1 includes multiple secondary robots 2. Each secondary robot 2 has a different set of characterized parameters associated with its shape, size, and function. Each set of characterized parameters can be compared to a set of environment parameters associated with a particular target zone collected by some of the first sensors, yielding a matching degree parameter. The first controller 10 is configured to calculate a matching degree parameter for each of the multiple secondary robot 2 whenever receiving a set of environment parameters associated with a target zone. Then, the particular one secondary robot 2 has a highest matching degree parameter will be assigned as it is the most suitable secondary robot for performing the second cleaning task in the particular target zone. In other words, the first controller 10 will send the first command via a signal transmitted to the particular one secondary robot 2 with the highest matching degree parameter. Optionally, the primary robot containing multiple different secondary robots is conveniently applicable to perform various kinds of cleaning tasks in different target zones with different environment. For example, for a low height zone, a secondary robot with relative low height is sent into it for cleaning. For narrow width zone, a secondary robot with relative narrow width is sent into it for cleaning. For a low-humidity zone, a secondary robot combined with a humidifier is a proper one to sent for cleaning.

Figure 9:
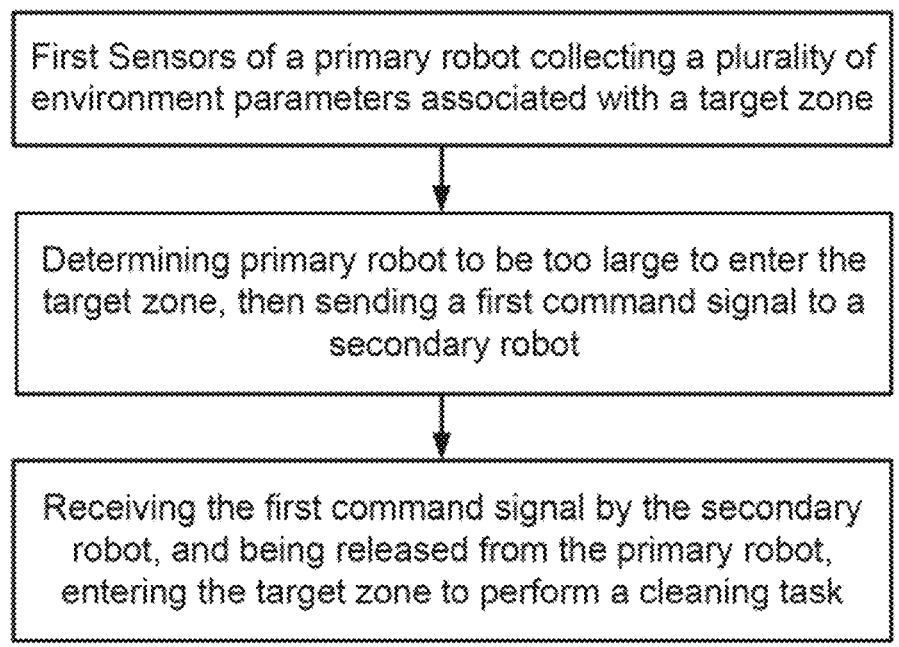
FIG. 9 is a flow chart illustrating a method of operating the cleaning robot of FIG. 3 to release a secondary robot from a primary robot for performing a cleaning task in a target zone in some embodiments.

In some alternative embodiments, the present disclosure provides a method of using a cleaning robot comprising a primary robot capable of releasing a secondary robot to perform a cleaning task in a target zone. As shown in FIG. 9, the method includes using a primary robot of the cleaning robot to sense and collect a plurality of environment parameters associated with the target zone (where the sensed environment parameters trigger a cleaning task). The cleaning robot can be just a cleaning robot 100) comprising the primary robot 1 configured to hold at least one secondary robot 2 in a chamber as described in FIG. 1. Both the primary robot 1 and the at least one secondary robot 2 (or simply called the secondary robot) can perform self-controlled, autonomous, independent cleaning tasks. The primary robot is configured to release the secondary robot from the holding chamber as illustrated in one or more examples shown in FIGS. 3-6. The method further includes determining if the primary robot is able to enter the target zone based on the sensed environment parameters. For example, the sensed environment parameters include a height, a width, a length, humidity, objects located within, particle densities of the target zone. For example, the height of the target zone is lower than a height of the primary robot, then the primary robot cannot enter the target zone. The method then includes transmitting a first command signal to a secondary robot which is held by the primary robot in a built-in chamber. The primary robot may contain one or more different types secondary robots with different shapes, sizes, and cleaning functions. The method includes releasing the secondary robot from the primary robot to the floor surface when the secondary robot receives the first command signal. The method further includes moving the secondary robot into the target zone and performing a cleaning task thereof.

Figure 10:
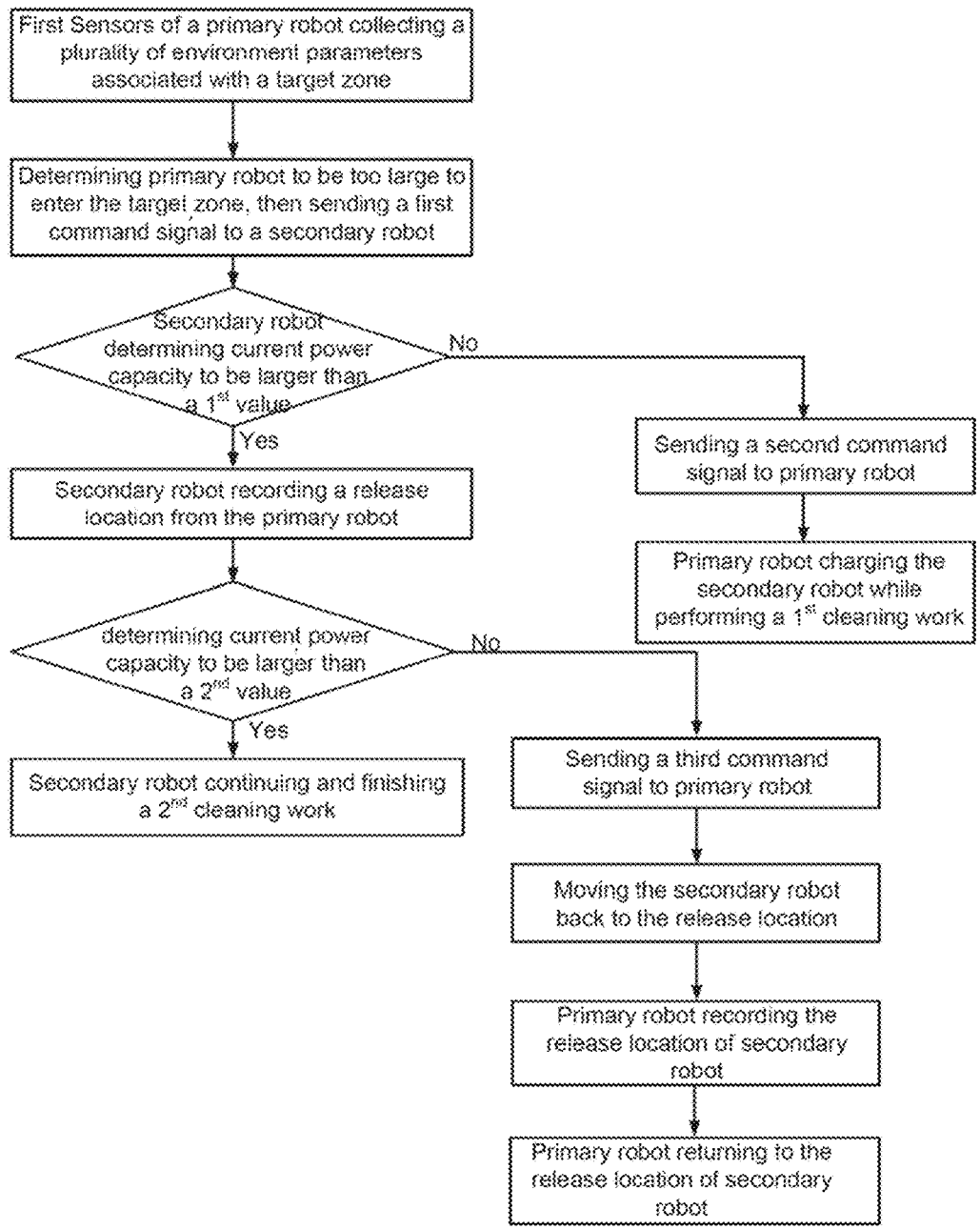
FIG. 10 is a flow chart illustrating a method of operating the cleaning robot of FIG. 3 to release a secondary robot from a primary robot for performing a cleaning task in a target zone in some embodiments.

FIG. 10 is a flow chart illustrating a method of operating the cleaning robot of FIG. 3 to release a secondary robot from a primary robot for performing a cleaning task in a target zone in some embodiments. Referring to FIG. 10, the method includes determining if the power capacity of the secondary robot is larger than a first power value after the secondary robot receives the first command signal. If the power capacity is found to be smaller than or equal to the first power value, the method includes transmitting a second command signal to the primary robot. Then the method includes retaining the secondary robot in the chamber of the primary robot charging the secondary robot by the primary robot, and operating the primary robot to perform a first cleaning task outside the target zone. If the power capacity is found to be greater than the first power value, the method includes releasing the secondary robot from the primary robot and operating the secondary robot to perform a second cleaning task in the target zone.

Additionally, the method includes recording location information in the secondary robot, the location information including a first location of releasing the secondary robot from the chamber of the primary robot to the floor surface. The method further includes determining if the power capacity of the secondary robot is greater than a second power value during operating the secondary robot to perform the second cleaning task, where the second power value is smaller than the first power value. If the power capacity of the secondary robot is found to be smaller than the second power value or if the second cleaning task is finished, the method includes transmitting a third command signal to the primary robot. Furthermore, the method includes moving the secondary robot back to the first location after sending the third command signal.

Moreover, the method includes recording the location information in the primary robot, the location information including the first location of releasing the secondary robot by the primary robot. After the primary robot receives the third command signal, the method includes moving the primary robot back to the first location (if the primary robot left the first location after releasing the secondary robot) so that it is ready to recover the secondary robot. The method also includes sensing if the primary robot is at the first location after the secondary robot moves back to the first location. The method further includes drive the secondary robot to move back into the chamber of the primary robot which is located at the first location.

Figure 11:
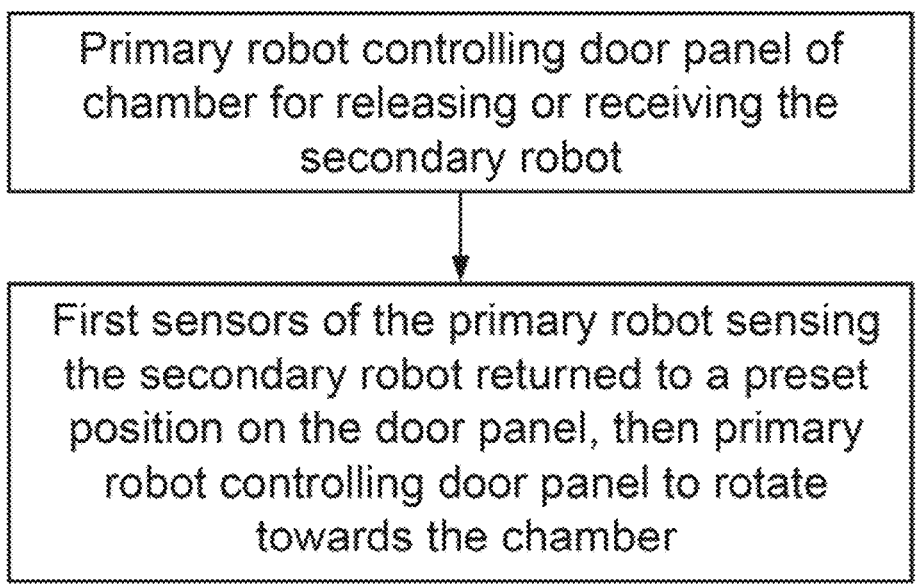
FIG. 11 is a flow chart illustrating a method of controlling a door panel of a chamber of a primary robot for recovering a secondary robot in some embodiments.

FIG. 11 is a flow chart illustrating a method of controlling a door panel of a chamber of a primary robot for recovering a secondary robot in some embodiments. Referring to FIG. 11, the chamber of the primary robot, which is used to hold or dock the one or more secondary robots, has a door structure including a door with a shaft set at a bottom region of the door and a door panel connected to the shaft. The method includes controlling the door panel to rotate away from the door to an open position until one end of the door panel touches the floor surface so that the secondary robot either can move along a top surface of the door panel from the chamber to the floor surface or vice versa. In a specific embodiment, the method includes sensing the position of the secondary robot on the door panel when it is moving towards the chamber. The method includes driving the primary robot to control the rotation of the door panel towards the door based on the sensed position of the secondary robot being the same as a predetermined position.

Figure 12:
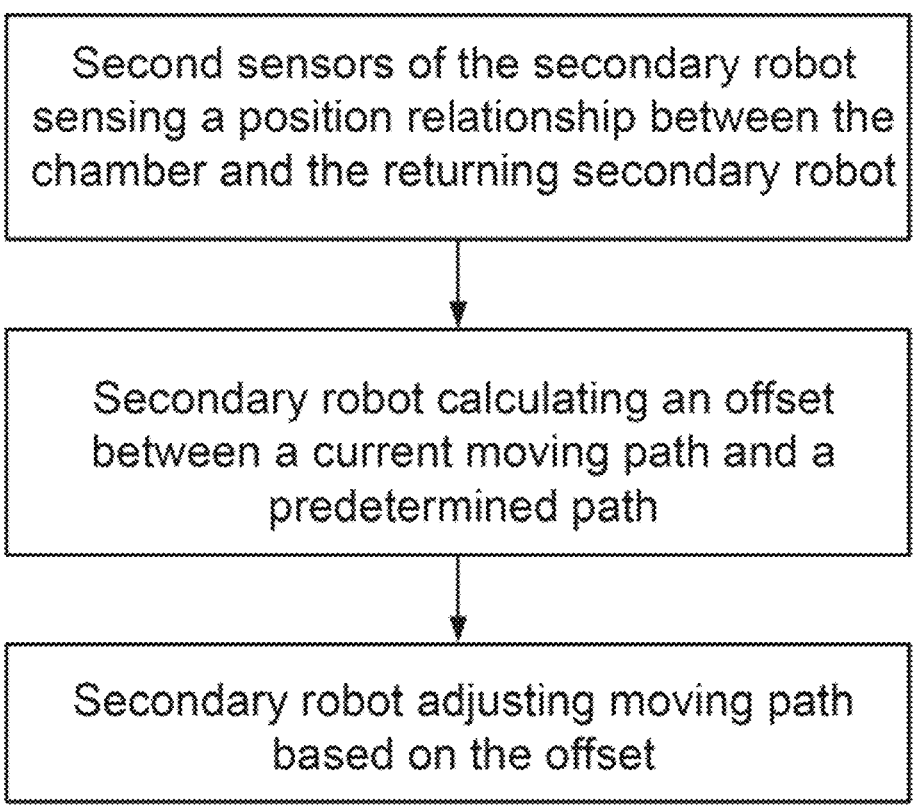
FIG. 12 is a flow chart illustrating a method for correcting a position and moving direction of a secondary robot during its returning into the chamber through a predetermined pathway in some embodiments.

FIG. 12 is a flow chart illustrating a method for correcting a position and moving direction of a secondary robot during its returning into the chamber through a predetermined pathway in some embodiments. Referring to FIG. 12, the method includes sensing a spatial relationship between the secondary robot and the door of the chamber of the primary robot during the secondary robot moves towards the chamber. Further, the method includes calculating an offset of a current moving path versus a predetermined path on the door panel based on the spatial relationship sensed by the secondary robot. The offset can be calculated using a clustering algorithm based either two distances of a sensor relative to two side edges of the door or two angles of incidence of the sensor relative to the two side edges of the door. Moreover, the method includes adjusting the current moving path based on the offset.

In some embodiments, the at least one secondary robot comprises multiple secondary robots. Each secondary robot has different shape, size, and function (moving, cleaning, power supply, sensing ability etc.). The method of operating the cleaning robot further includes calculating a matching degree parameter based on comparison of a set of environment parameters associated with a target zone collected by the plurality of first sensors in the primary robot and a set of character parameters associated with a corresponding one of the multiple secondary robots. The method includes selecting one secondary robot having a highest matching degree parameter. Then, the method includes sending the first command signal to the selected one secondary robot to release it from the primary robot for performing a cleaning task in the target zone.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second". etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A cleaning robot comprising:
a primary robot comprising a first controller configured to control a plurality of first sensors, a first communication module, a first moving apparatus, and a first cleaning assembly; and
at least one secondary robot comprising a second controller configured to control a plurality of second sensors, a second communication module, a second moving apparatus, and a second cleaning assembly;
wherein the plurality of first sensors are configured to collect a plurality of environmental parameters associated with a target zone inaccessible to the primary robot;
the first controller is configured to drive the first moving apparatus and the first cleaning assembly to perform a first cleaning task outside the target zone, to generate a first command signal based on the plurality of environmental parameters, and to control the first communication module to transmit the first command signal to the second communication module;
the second controller is configured to drive the second moving apparatus to have a secondary robot moving into the target zone and operate the second cleaning assembly of the secondary robot to perform a second cleaning task inside the target zone, upon receiving the first command signal from the second communication module;
the plurality of second sensors comprise a first sensor to detect trash amount collected by the second cleaning assembly and a second sensor to detect cleaning agent amount stored in the second cleaning assembly; and
the second controller is configured to determine that the second cleaning task is finished when the first sensor detects no change in the trash amount over a certain period of time or the second sensor detects the cleaning agent amount to be substantially below a threshold value.

2. The cleaning robot of claim 1, wherein the plurality of first sensors comprises one or more of an infrared sensor, a visual sensor, an ultra-sound sensor, a laser radar sensor, a cliff sensor, a bumper sensor, a gyro sensor, and any combination thereof.

3. The cleaning robot of claim 1, wherein the plurality of environment parameters associated with the target zone comprises one or more of height, width, shape, humidity, particle densities of the target zone and any objects therein.

4. The cleaning robot of claim 1, wherein the primary robot further comprises a chamber configured for holding the at least one secondary robot;
the second controller is configured to drive the second moving apparatus to have a secondary robot released from the chamber into the target zone;
the chamber comprises a door panel having a first end coupled to a shaft and configured to rotate around the shaft and a second end;

the first controller is configured to open the door panel of the chamber such that the door panel rotates relative to a shaft till the second end touching a floor surface at a first location while controlling the first communication module to transmit the first command signal to the second communication module, and configured to record a location information of the first location; and the second controller is configured to drive the second moving apparatus to have the secondary robot released from a docking position in the chamber via the door panel onto the floor surface at the first location upon receiving the first command signal, and configured to record the location information of the first location before further driving the second moving apparatus to move the secondary robot to any second location in the target zone.

5. The cleaning robot of claim 4, further comprising a first power supply having a first charge capacity in the primary robot and a second power supply having a second charge capacity in the secondary robot, the first charge capacity being substantially larger than the second charge capacity;
wherein the second controller is configured to generate a second command signal based on readout of a current power capacity of the second power supply below a first threshold value and to control the second communication module to transmit the second command signal to the first communication module.

6. The cleaning robot of claim 5, wherein, upon receiving the second command signal at the first communication module, the first controller is configured to maintain the secondary robot at the docking position in the chamber and control the first power supply to charge the second power supply until the readout of the current power capacity of the second power supply is above a second value, the second value being greater than the first threshold value.

7. The cleaning robot of claim 5, wherein the second controller is configured to generate a third command signal based on readout of the current power capacity of the second power supply below a third value, the third value being less than the first threshold value; or based on a sensed value indicating that the second cleaning task is finished and to control the second communication module to transmit the third command signal to the first communication module.

8. The cleaning robot of claim 4, wherein a surface of the second end distal to the floor surface is a curve surface.

9. The cleaning robot of claim 8, wherein an angle between the surface of the door panel distal to the floor surface and the floor surface is substantially equal to or less than 14 degrees.

10. The cleaning robot of claim 1, wherein the at least one secondary robot includes multiple secondary robots, each of the multiple secondary robots is characterized by a series of character parameters comprising a shape, a size, and a code representing one or more cleaning functions; and
the first controller is configured to calculate a matching degree parameter based on a comparison between the plurality of environmental parameters associated with the target zone and the series of character parameters of each of the multiple secondary robots, and to control the first communication module to transmit the first command signal to a second communication module of a corresponding one of the multiple secondary robots having the highest matching degree parameter indicating a closest matching between the plurality of environmental parameters associated with the target zone and the series of character parameters.

11. The cleaning robot of claim 1, wherein the first communication module and the second communication module are configured to communicate via one or more of Radio, Wireless, and GPS technologies selected from one of a group of Bluetooth™, Infrared, Zigbee™, GRPS, and WI-FI™ or a combination thereof.

12. A cleaning robot comprising:
a primary robot comprising a first controller configured to control a plurality of first sensors, a first communication module, a first moving apparatus, and a first cleaning assembly; and
at least one secondary robot comprising a second controller configured to control a plurality of second sensors, a second communication module, a second moving apparatus, and a second cleaning assembly;
wherein the plurality of first sensors are configured to collect a plurality of environmental parameters associated with a target zone inaccessible to the primary robot;
the first controller is configured to drive the first moving apparatus and the first cleaning assembly to perform a first cleaning task outside the target zone, to generate a first command signal based on the plurality of environmental parameters, and to control the first communication module to transmit the first command signal to the second communication module; and
the second controller is configured to drive the second moving apparatus to have a secondary robot moving into the target zone and operate the second cleaning assembly of the secondary robot to perform a second cleaning task inside the target zone, upon receiving the first command signal from the second communication module;
wherein the primary robot further comprises a chamber configured for holding the at least one secondary robot;
the second controller is configured to drive the second moving apparatus to have a secondary robot released from the chamber into the target zone;
the chamber comprises a door panel having a first end coupled to a shaft and configured to rotate around the shaft and a second end;
the first controller is configured to open the door panel of the chamber such that the door panel rotates relative to a shaft till the second end touching a floor surface at a first location while controlling the first communication module to transmit the first command signal to the second communication module, and configured to record a location information of the first location; and
the second controller is configured to drive the second moving apparatus to have the secondary robot released from a docking position in the chamber via the door panel onto the floor surface at the first location upon receiving the first command signal, and configured to record the location information of the first location before further driving the second moving apparatus to move the secondary robot to any second location in the target zone;
wherein the cleaning robot further comprises a first power supply having a first charge capacity in the primary robot and a second power supply having a second charge capacity in the secondary robot, the first charge capacity being substantially larger than the second charge capacity;
the second controller is configured to generate a second command signal based on readout of a current power capacity of the second power supply below a first threshold value and to control the second communication module to transmit the second command signal to the first communication module; and the second controller is configured to generate a third command signal based on readout of the current power capacity of the second power supply below a third value, the third value being less than the first threshold value; or based on a sensed value indicating that the second cleaning task is finished and to control the second communication module to transmit the third command signal to the first communication module;

wherein, upon receiving the third command signal at the first communication module, the first controller is configured to drive the first moving apparatus to move the primary robot back to the first location based on the recorded location information in the first controller and open the door panel of the chamber so that the door panel rotates relative to the shaft to have one end touching the floor surface at the first location; and the second controller is configured to drive the second moving apparatus to move the secondary robot from any second location to the first location based on the recorded location information in the second controller.

13. The cleaning robot of claim 12, wherein the first controller is further configured to control the plurality of first sensors to collect a plurality of environment parameters associated with the secondary robot moving from the floor surface at the first location onto the door panel, and to control the door panel gradually rotating towards the chamber based on the plurality of environment parameters indicating the secondary robot at a predetermined position of the door panel while moving towards the docking position in the chamber.

14. The cleaning robot of claim 13, wherein the second controller is further configured to control the plurality of second sensors to collect a plurality of environment parameters associated with a relative orientation of the primary robot and the secondary robot, to calculate an offset for a current moving path of the secondary robot, and to adjust moving direction of the secondary robot based on the offset.

15. A method of operating a cleaning robot comprising a primary robot and a secondary robot, comprising:

sensing a target zone via a plurality of first sensors to collect a plurality of environment parameters;

determining that the primary robot is larger than the target zone, and transmitting a first command signal to the secondary robot;

receiving the first command signal by the secondary robot;

releasing the secondary robot from a docking position in the primary robot upon receiving the first command signal by the secondary robot;

performing a second cleaning task by the secondary robot in the target zone;

recording location information in the secondary robot, the location information including a first location of releasing the secondary robot from the primary robot; and determining whether a power capacity available to the secondary robot is smaller than or equal to a second threshold capacity;

wherein based on a determination that the second threshold capacity is smaller than a first threshold capacity, the method further comprises:

sending a third command signal to the primary robot; and moving the secondary robot from any location in the target zone back to the first location after sending the third command signal.

16. The method of claim 15, further comprising:

upon receiving the first command signal by the secondary robot, determining whether a power capacity available to the secondary robot is larger than a first threshold capacity to operate the secondary robot to perform the second cleaning task in the target zone;

wherein, based on a determination that the power capacity available to the secondary robot is smaller than or equal to the first threshold capacity, the method further comprises:

sending a second command signal to the primary robot;

charging the secondary robot retained in a chamber of the primary robot; and performing a first cleaning task by the primary robot outside the target zone.

17. The method of claim 15, further comprising:

recording the location information in the primary robot, the location information including the first location of releasing the secondary robot from the primary robot;

receiving the third command signal by the primary robot; and moving the primary robot back to the first location upon receiving the third command signal by the primary robot.

18. The method of claim 17, wherein the primary robot comprises a chamber, the method further comprising:

sensing by the secondary robot that the primary robot returns to the first location while the secondary robot is moving back to the first location; and moving the secondary robot back into the chamber if the primary robot is at the first location.

* * * * *